July 17, 1928.

H. FORD 1,677,279

COMBINED INSTRUMENT BOARD AND GAS TANK CONSTRUCTION

Filed Feb. 14, 1927   3 Sheets-Sheet 1

INVENTOR
Henry Ford,
BY
ATTORNEY

July 17, 1928.

H. FORD 1,677,279

COMBINED INSTRUMENT BOARD AND GAS TANK CONSTRUCTION

Filed Feb. 14, 1927   3 Sheets-Sheet 2

INVENTOR
Henry Ford.
BY
E.H.Davis ATTORNEY

July 17, 1928.

H. FORD 1,677,279

COMBINED INSTRUMENT BOARD AND GAS TANK CONSTRUCTION

Filed Feb. 14, 1927

INVENTOR.

Henry Ford.

BY

ATTORNEY.

Patented July 17, 1928.

1,677,279

UNITED STATES PATENT OFFICE.

HENRY FORD, OF DEARBORN, MICHIGAN.

COMBINED INSTRUMENT-BOARD AND GAS-TANK CONSTRUCTION.

Application filed February 14, 1927. Serial No. 167,912.

The object of my invention is to provide a combined instrument board and gas tank of simple, durable, and inexpensive construction.

Still a further object of my invention is to provide an instrument board which may co-act with a gasoline tank, to receive its support from the gasoline tank, and to support and disclose the various instruments mounted on the instrument board or between the latter and the gasoline tank. It will be understood that this construction is particularly adapted for vehicles having the gasoline tank mounted near the top of the cowl in the body.

Still a further object of my invention is to provide such a construction wherein the instrument board may be apertured to disclose an instrument mounted on the rear wall of the gasoline tank.

Still a further object of my invention is to provide a cowl gasoline tank having a conduit disposed along the lower surface thereof for housing the wiring and connections for the instruments on the instrument board, in combination with an instrument board adapted to be supported by the rear wall of the gasoline tank and shaped to co-act with the conduit to form a finished structure which is easily installed or disassembled.

Still a further object of my invention is to provide a cowl gasoline tank with an instrument board which is in the form of a shell which may fit against the rear surface of the gasoline tank to thereby form with the wall of the gasoline tank a substantially closed chamber for the instruments associated therewith, and to so arrange the instruments on the instrument board that they may be grouped around and lighted by a single dash light located centrally on the instrument board.

Still a further object of my invention is to provide in combination with a cowl, fuel tank, and an instrument board, a gasoline gage mounting whereby combined fittings may be used for securing the gage and instrument board to the rear wall of the tank.

With these and other objects in view, my invention consists in the arrangement, combination and construction of the various parts of my improved device, as described in the specifications, claimed in the claims, and illustrated in the accompanying drawings in which:

Figure 2:
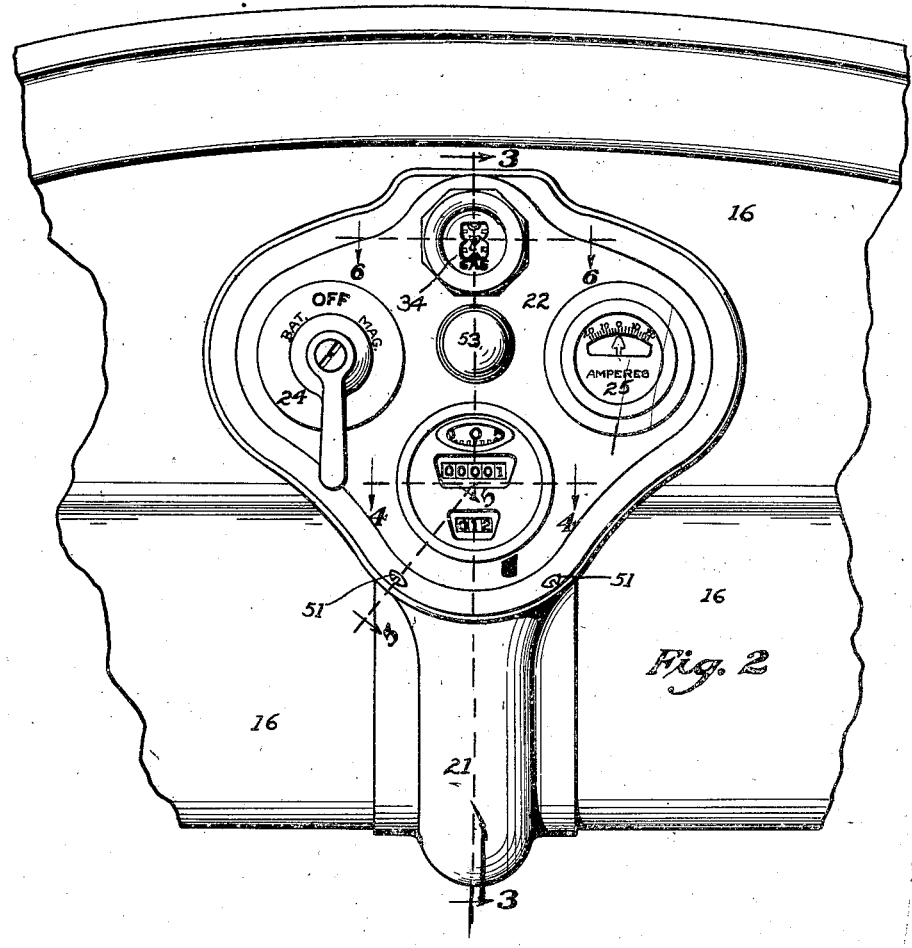
Fig. 2 is a front elevation of the parts shown in Fig. 1.
Figure 1:
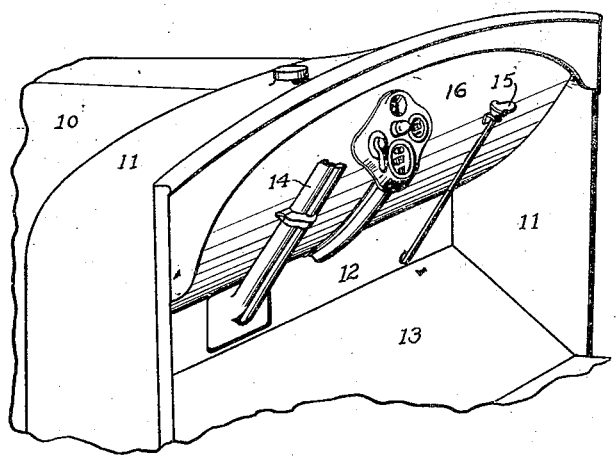
Fig. 1 shows a perspective view of a vehicle body, having my improved cowl fuel tank and instrument board mounted thereon.
Figure 3:
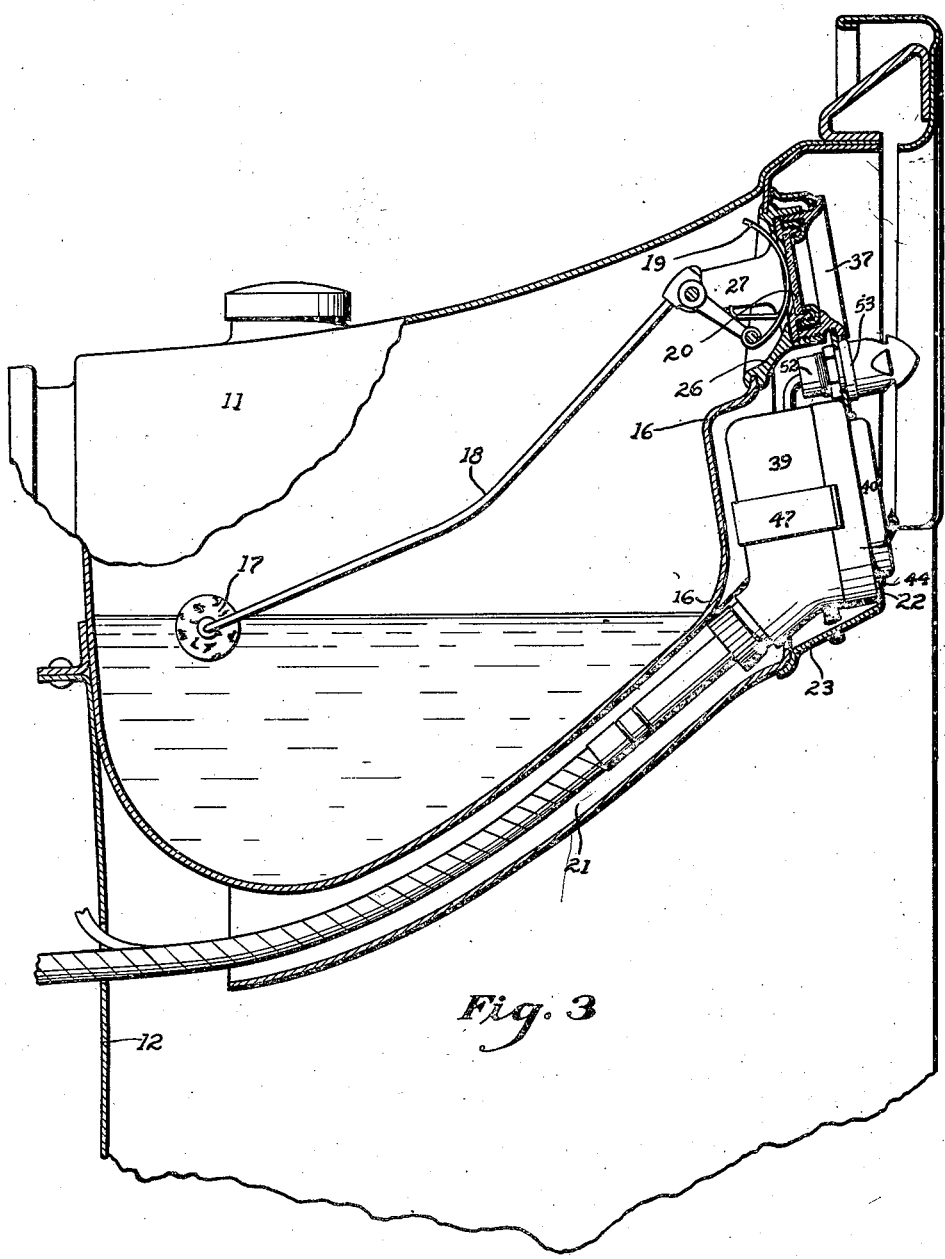
Fig. 3 shows a vertical longitudinal sectional view through the combined instrument board and gasoline tank assembly, taken on line 3—3 of Fig. 2.
Figure 4:
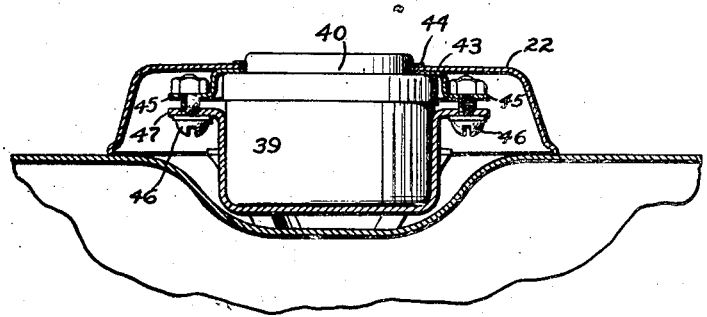
Fig. 4 shows a horizontal sectional view taken on the line 4—4 of Fig. 2.

Referring to the accompanying drawings I have used the reference numeral 10 to indicate generally the hood of the vehicle body having the cowl 11. The body is also provided with a dash 12 and floor boards 13. A steering column 14 and a choke rod and carbureter adjusting device 15 are also illustrated. These parts are of ordinary construction in connection with a vehicle body and are illustrated herein to more clearly illustrate the construction and function of my improved dash tank and instrument board.

The dash tank which I have herein illustrated consists of two members, of which the cowl 11 is the upper member and the lower member 16 is shaped so that when its edges are united with the proper parts of the cowl that a hollow receiving chamber may be formed therebetween.

A gasoline gage comprising the float 17 mounted on the pivoted arm 18 is adapted to swing an indicating strip 19 past a gage window 20 in the rear wall of the member 16.

Below the gasoline gage a conduit 21 is formed on the lower surface of the gas tank as by welding a channel shaped strip of sheet metal thereto. This conduit 21 is adapted to receive the wires and speedometer cable from instrument board and protect and conceal them until they reach a position adjacent to the dash 12, through which they may be extended.

Figure 5:
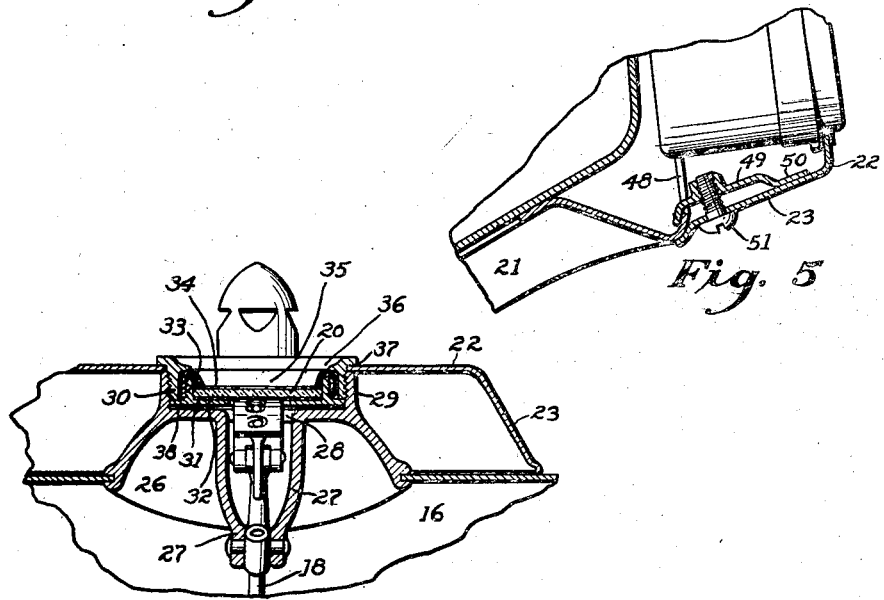
Fig. 5 shows a sectional view taken on the line 5—5 of Figure 2.
Figure 6:
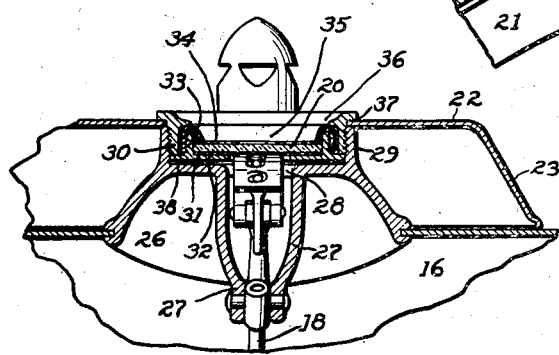
Fig. 6 shows a horizontal sectional view taken on line 6—6 of Fig. 2.

The instrument board proper consists of a shell of sheet metal 22 which is substantially rectangular in outline, although the corners are round and the intermediate portions are curved to give it an artistic configuration. The upper corner is also shortened or cut off. The instrument board 22 is provided with a forwardly extending peripheral flange 23 adapted to bear against a rear wall of the gasoline tank to thereby form with the gasoline tank a substantially closed chamber. The lower corner of the instrument board 22 is shaped to co-act with the wall of the gasoline tank and the conduit 21 so that the enclosure is not substantially broken at their meeting point. This is accomplished by shaping the flange 23 so that it will slide over the rear end of the conduit 21 (as is illustrated in Fig. 5) when the instrument board is installed. Mounted on this instrument board is an ignition switch 24 which may of course also be of the type containing the switch for both ignition and lights for the motor vehicle. The construction of this switch is not here illustrated as the manner of constructing same and mounting it on an instrument board is well known. Switch 24 is preferably mounted at the left hand corner of the instrument board.

At the right hand corner of the instrument board an ammeter 25 is mounted in the manner in which such instruments are usually mounted on an instrument board.

Referring further to the construction of the gasoline gage that has heretofore been mentioned, it will be seen that a frame member 26 which is preferably a die casting, is sealed into an opening in the rear wall 16 of the gasoline tank, this frame being provided with a pair of integral forwardly extending ears 27 designed to form a pivotal support for the arm 18. The indicating device 19 is pivotally mounted on the upper end of the arm 18 and extends through an aperture 28 between the ears 27 of the frame 26. An annular rearwardly extending flange 29 is formed integrally with the frame 26 so that the rear face of the frame 26 forms with the flange 29 a cup shaped recess. This recess is formed with an internal thread 30, having a purpose which will hereinafter be described. Disposed in this recess in the frame 26 is a disc 31 designed to support the gage glass 20 which has heretofore been mentioned. A liquid tight gasket 32 is provided between the discs 31 and glass 20. The disc 31 has an annularly rearwardly extending exteriorly threaded flange 33 near its edges which serves to prevent lateral or vertical displacement of the glass 20. Rearwardly of the glass 20 is a disc 34 upon which indicating characters may be impressed or pointers provided so that the indicating strip 19 may coact with the recess in said disc 34 to indicate the amount of fuel in the gasoline tank. A bezel 35 of channel cross section has the outer portion thereof internally threaded to coact with the threads of the flange 33 on the disc 31 so that this bezel may be screwed down on to the said flange to thereby press the inner edge of the bezel against the disc 34 thereby squeezing the disc 34 against the glass 20 and the latter against the washer 31 to thereby make a liquid tight joint between the glass 20 and the disc 31.

The instrument board shell 22 is provided with an opening which registers with the flange 29 of the frame 26. A second bezel 36 is provided with a shoulder 37 which presses against the edge of the opening in the instrument board 22 to press the latter against the flange 29 of the frame 26 thereby locking the upper portion of the instrument board against the frame 26 and consequently to the rear wall of the fuel tank. The threaded portion of the bezel 36 extends forwardly far enough to contact with the periphery of the disc 31 outside of the bezel 33 so that the bezel 36 may press against the disc 31 thereby compressing a gasket 38 against the frame 26 so that a liquid tight joint may be formed between the frame 26 and the disc 31. From the foregoing it will be seen that the bezel 36 serves to secure the instrument board 22 to the rear wall of the gas tank and also to secure and seal the gage glass assembly in place in the gage.

The instrument board 22 is provided with an opening within the lower corner thereof, designed to receive speedometer head 39. This head is provided with a contracted portion 40, designed to extend thru the opening in the instrument board 22 so that the speedometer may be read from the rear of the instrument board. A ring 43 under the instrument board surrounds the speedometer opening and has a flange thereon which is turned over the edge of this opening to form a garnish for the edge and to support the ring 43 from the instrument board 22. This ring 43 is provided with a plurality of laterally extending ears 45 which have openings therein designed to receive bolts 46. The speedometer head is provided with corresponding ears 47 through which these bolts 46 pass whereby the bolts 46 may draw the speedometer head 39 against the rear surface of the instrument board 22 to thereby lock the speedometer head in place. It will thus be seen that the speedometer head is supported from the instrument board.

As has heretofore been noted, the instrument board 22 is provided with flange 23 which bears against the end of the conduit 21. This end of the conduit 21 is turned up or flanged as is indicated at 48 so as to form a broad bearing surface for the flange 23. A pair of spaced clips 49 are welded as at 50 to the inner surface of the flange 23 so that the flange 48 of the conduit may be gripped between the flange 23 and the clips 49. These clips 49 are provided with threaded openings so that screws 51 may be extended through the flange 23 to draw the body portion of the clip 49 toward the flange 23, thereby causing a positive connection between the flanges 23 and 48 and the clips 49.

At approximately the center of the instrument board 22 a dash light having a base 52 is secured to the instrument board. A detachable glare shield 53 of substantially cylindrical form but having one end closed is mounted on the base 52 in any suitable manner as by frictional engagement therewith. The closed end of this glare shield 53 is of somewhat conical shape, and is provided with four equally spaced substantially rectangular openings therein, which are proportioned so as to allow a band of light, originating from a bulb inside of the glare shield and reflected from the inner concave side of the shield, to escape and illuminate only the instrument board. In this connection attention is directed to the fact that beams of light have not been directed upwardly heretofore in connection with dash lights because a dazzling beam would be reflected into the driver's eyes unless the graduated type of opening which I have here provided is used.

Among the many advantages arising from the use of my improved device it should be first pointed out that I have provided a compact structure which is adapted for use with a cowl fuel tank and which eliminates the necessity for an instrument board which extends entirely across the vehicle. Further, accessibility of the instruments and their mounting on the instrument board are enhanced as adjustment or replacement may be made by simply unscrewing the bezel 36 and screws 51 which permit the instrument board to be pulled rearwardly thereby exposing the rear face thereof, and gives access to all the instruments thereon. Further I have devised an instrument board construction permitting all of the instruments to be grouped around a central dash light, which economizes space and improves illumination.

Further I have provided a construction where the rear wall of the cowl gasoline tank provides the support for the instrument board, and the instruments thereon, whereby the efficiency is increased and the cost lessened.

Some changes may be made in the construction, arrangement and combination of the various parts of my improved device without departing from the spirit of my invention, and it is my intention to cover by my claims such changes as may reasonably be included within the scope thereof.

I claim as my invention:

1. In a combined instrument board and cowl fuel tank construction, a tank having a recess in its rear wall, and an instrument board having a peripheral flange adapted to co-act with the rear wall of the gasoline tank adjacent to said recess to form a chamber whereby an instrument may be mounted in said chamber.

2. In a device of the character described, a cowl fuel tank having a rear wall and a bottom wall, a member secured to the lower wall of the gasoline tank and adapted to form a conduit, and an instrument board having a peripheral flange adapted to co-act with the rear wall of the gasoline tank and the rear end of the said conduit member to form an enclosed chamber for the instruments on the instrument board and to form a concealing and protecting conduit for the structures which connect with the instruments.

3. In a combined cowl fuel tank and instrument board construction, a fuel tank having an opening in its rear wall, an indicating instrument mounted in said opening, and an instrument board adapted to be secured to the rear wall of said fuel tank and having an opening therein designed to register with the indicating portion of said indicating instrument.

4. In a device of the character described, a cowl, a fuel tank having a rear wall, an instrument mounted on said wall of the gasoline fuel tank, said instrument having a glass receiving recess therein and a glass therefor, and an instrument board having a peripheral flange and an opening therethrough, whereby the instrument board and flange may form with the rear wall of the gasoline tank an instrument enclosing chamber and the opening may register with the instrument, a combined means for securing the gage glass and instrument board in place.

HENRY FORD.